United States Patent
Takahashi et al.

(10) Patent No.: US 10,590,551 B2
(45) Date of Patent: Mar. 17, 2020

(54) ELECTRODE FOR ELECTROLYSIS, MANUFACTURING METHOD OF ELECTRODE FOR ELECTROLYSIS, AND ELECTROLYZER

(71) Applicant: DE NORA PERMELEC LTD, Fujisawa-shi, Kanagawa (JP)

(72) Inventors: Suguru Takahashi, Fujisawa (JP); Akihiro Madono, Fujisawa (JP); Takamichi Kishi, Fujisawa (JP); Osamu Arimoto, Fujisawa (JP)

(73) Assignee: DE NORA PERMELEC LTD, Fujisawa-Shi (JP)

( * ) Notice: Subject to any disclaimer, the term of this patent is extended or adjusted under 35 U.S.C. 154(b) by 0 days.

(21) Appl. No.: 15/753,646

(22) PCT Filed: Apr. 27, 2017

(86) PCT No.: PCT/JP2017/016872
§ 371 (c)(1),
(2) Date: Feb. 20, 2018

(87) PCT Pub. No.: WO2017/188421
PCT Pub. Date: Nov. 2, 2017

(65) Prior Publication Data
US 2018/0282884 A1    Oct. 4, 2018

(30) Foreign Application Priority Data

Apr. 27, 2016 (JP) .................................. 2016-089143

(51) Int. Cl.
*C25B 11/04* (2006.01)
*C25B 9/08* (2006.01)
(Continued)

(52) U.S. Cl.
CPC ............ *C25B 11/0405* (2013.01); *C25B 1/10* (2013.01); *C25B 1/46* (2013.01); *C25B 9/08* (2013.01);
(Continued)

(58) Field of Classification Search
None
See application file for complete search history.

(56) References Cited

U.S. PATENT DOCUMENTS 3,921,031 A * 11/1975 Dubois ..................... H01J 1/30
  315/94
4,169,025 A *  9/1979 Needes ................. B22F 3/1134
  204/292

(Continued)

FOREIGN PATENT DOCUMENTS

CN    101029405 A    9/2007
CN    102046851 A    5/2011
(Continued)

OTHER PUBLICATIONS

Vielstich, Die Abscheidungsspannung von Wasserstoff bei der Elektrolyse wäßriger Lösungen mit Raney-Metallelektroden, Chemie Ingenieur Technik, vol. 33, No. 2, Feb. 1961, pp. 75-79 (Year: 1961).*

(Continued)

*Primary Examiner* — Harry D Wilkins, III
(74) *Attorney, Agent, or Firm* — Birch, Stewart, Kolasch & Birch, LLP

(57) ABSTRACT

Provided are an electrode for electrolysis having excellent durability against reverse current, and a method that enables production of the electrode for electrolysis at low cost. The electrode for electrolysis 130 includes a conductive substrate 132 on which a catalyst layer is formed, and a reverse current absorption body 134 that is coupled to the conduc- (Continued)

tive substrate 132 in a detachable manner, wherein the reverse current absorption body 134 is formed from a sintered compact containing nickel. The method for producing the electrode for electrolysis 130 includes a sintered compact formation step of obtaining the sintered compact by sintering a raw material powder composed of any one of Raney nickel alloy particles containing nickel and an alkali-soluble metal element, metallic nickel particles, and a mixture of Raney nickel alloy particles and metallic nickel particles, and a coupling step of coupling the sintered compact to the conductive substrate 132.

9 Claims, 7 Drawing Sheets

(51) Int. Cl.
　　*C25B 9/20* (2006.01)
　　*C25B 11/03* (2006.01)
　　*C25B 1/10* (2006.01)
　　*C25B 1/46* (2006.01)
　　*C25B 15/00* (2006.01)

(52) U.S. Cl.
　　CPC .............. *C25B 9/20* (2013.01); *C25B 11/03* (2013.01); *C25B 11/04* (2013.01); *C25B 15/00* (2013.01); *Y02E 60/366* (2013.01)

(56) References Cited

U.S. PATENT DOCUMENTS

| | | | | |
|---|---|---|---|---|
| 4,225,346 | A * | 9/1980 | Helliker | B22F 3/1121 419/2 |
| 5,861,225 | A * | 1/1999 | Corrigan | H01M 4/26 205/57 |
| 6,177,213 | B1 * | 1/2001 | Fetcenko | H01M 4/32 429/218.1 |
| 2011/0089027 | A1 | 4/2011 | Sasaki et al. | |
| 2012/0241314 | A1 | 9/2012 | Madono et al. | |
| 2014/0072836 | A1 | 3/2014 | Mills | |
| 2015/0027878 | A1 | 1/2015 | Funakawa et al. | |

FOREIGN PATENT DOCUMENTS

| | | |
|---|---|---|
| JP | 61-204397 A | 9/1986 |
| JP | 62-182294 A | 8/1987 |
| JP | 06-146046 A | 5/1994 |
| JP | 2001-234379 A | 8/2001 |
| JP | 2002-206186 A | 7/2002 |
| JP | 2004-323955 A | 11/2004 |
| JP | 2005-089779 A | 4/2005 |
| JP | 2010-209420 A | 9/2010 |
| JP | 2015-183254 A | 10/2015 |
| WO | WO 2012/032793 A1 | 3/2012 |
| WO | WO 2013/141211 A1 | 9/2013 |

OTHER PUBLICATIONS

International Search Report for PCT/JP2016/072391 (PCT/ISA/210) dated Jun. 27, 2017.
Written Opinion of the International Searching Authority for PCT/JP2016/072391 (PCT/ISA/237) dated Jun. 27, 2017.
Written Opinion of the International Searching Authority and International Search Report (forms PCT/ISA/237 and PCT/ISA/210), dated Jun. 27, 2017, for International Application No. PCT/JP2017/016873, with English translations.
International Search Report for PCT/JP2017/016872 (PCT/ISA/210) dated Apr. 27, 2017.
Written Opinion of the International Searching Authority for PCT/JP2017/016872 (PCT/ISA/237) dated Apr. 27, 2017.
European Search Report, dated Oct. 1, 2018, for European Application No. 17789702.2.
Office Action dated Dec. 10, 2018 in U.S. Appl. No. 15/753,631.
Office Action dated May 1, 2019 in U.S. Appl. No. 15/753,631.
Korean Office Action for Application No. 10-2018-7034210, dated Jun. 4, 2019, with English language translation.
Korean Office Action for Application No. 10-2018-7034211, dated Jun. 4, 2019, with English language translation.
U.S. Office Action dated Nov. 6, 2019, in U.S. Appl. No. 15/753,631.

\* cited by examiner

ELECTRODE FOR ELECTROLYSIS, MANUFACTURING METHOD OF ELECTRODE FOR ELECTROLYSIS, AND ELECTROLYZER

TECHNICAL FIELD

The present invention relates to an electrode for electrolysis, a method for producing the same and an electrolyzer using the same, and in particular, relates to an electrode for electrolysis that is applicable to an alkali metal aqueous solution electrolytic apparatus, a method for producing the same, and an electrolyzer using the same.

BACKGROUND ART

Known types of electrolysis include alkali chloride electrolysis such as brine electrolysis, and alkali metal aqueous solution electrolysis such as alkaline water electrolysis and alkali sulfate electrolysis. In an alkali metal aqueous solution electrolytic apparatus, the electrolyzer houses a plurality of internal electrolytic cells. Each electrolytic cell has a cathode chamber that houses a cathode, an anode chamber that houses an anode, and a partition wall that separates the cathode chamber and the anode chamber. The inside of the electrolyzer is arranged so that the cathode chamber and anode chamber of adjacent electrolytic cells oppose one another, and a diaphragm is disposed between the electrolytic cells. For example, in a brine electrolytic apparatus, an ion exchange membrane method that uses an electrolyzer containing an ion exchange membrane as the diaphragm is often used (Patent Document 1).

In electrolysis using the type of electrolyzer described above, if operation of the electrolyzer is stopped due to trouble or the like, then a reverse current (a current in the reverse direction to the electrolytic current) flows through the electrolyzer. Particularly in the case of bipolar electrolyzers, which are the most common form of electrolyzers for brine electrolysis, the size of the reverse current increases in proportion to the square of the number of electrolytic cells. In recent years, there is a trend toward larger electrolyzers, resulting in an associated increase in the number of electrolytic cells. As a result, the size of the reverse current that flows when the electrolysis is stopped has also increased.

As a result of this reverse current flow, cathode degradation occurs in which the cathode catalyst (noble metal material) is eluted as a result of oxidation. In recent years, rather than platinum (Pt) or rhodium (Rh), the less expensive ruthenium (Ru) has become more widely used as the cathode catalyst material. However, because Ru is easily eluted as a result of reverse current, a more effective countermeasure for preventing oxidation caused by reverse current is required.

In order to prevent cathode degradation caused by reverse current, one measure that has been taken involves applying a very weak current through the electrolyzer during shutdowns of the electrolyzer, thereby maintaining the cathode potential at the hydrogen generation potential. However, there is a risk that the generated hydrogen may pass through the diaphragm, diffuse into the anode side, and mix with the oxygen gas generated at the anode side to form an explosive gas, and this risk must be avoided. Accordingly, initial capital costs and operating costs tend to increase as a result of the complexity of the operating procedure and the requirement for additional equipment.

Another countermeasure that has been proposed for suppressing cathode degradation caused by reverse current flow during operational shutdowns involves placing a material containing a substance that preferentially absorbs the reverse current inside the cathode chamber.

Patent Document 1 proposes providing a reverse current absorption layer, which is connected electrically to the cathode, inside the cathode chamber. The reverse current absorption layer in Patent Document 1 contains a material having a lower redox potential than the cathode material. Because the reverse current is consumed by an oxidation reaction of the reverse current absorption layer rather than the cathode, oxidative degradation of the cathode due to the reverse current is suppressed. The reverse current absorption layer of Patent Document 1 is formed by a deposition technique such as thermal spraying onto a substrate such as a current collector, metal elastic body or partition wall inside the electrolytic cell. Alternatively, a reverse current absorption body composed of a reverse current absorption layer formed on a separate independent substrate may be attached to an electrolytic cell component such as a current collector or metal elastic body.

Patent Document 2 proposes a cathode structure including an active cathode, a cathode current collector and an elastic cushion material, wherein at least a surface layer of the cathode current collector is composed of an active material that can consume a greater oxidation current per unit of surface area than the active cathode. Specific examples of this type of active material include Raney nickel, Raney nickel alloys, activated carbon-nickel composite plating, and composite plating of hydrogen storage alloy particles. When the electrolyzer is stopped and a reverse current flows, this active material on the cathode current collector preferentially consumes the oxidation current, enabling oxidation of the active cathode that accompanies anodic polarization to be suppressed to a minimum.

CITATION LIST

Patent Documents

Patent Document 1: International Patent Application No. 2013/141211

Patent Document 2: International Patent Application No. 2012/032793

SUMMARY OF INVENTION

Technical Problem

In Patent Document 1 and Patent Document 2, a substrate is required for providing the thin film-like reverse current absorption layer. In those cases where the substrate is a structural component of the electrolytic cell, because the substrate shape is large and complex, formation of the reverse current absorption layer is not easy. Once the reverse current absorption layer has been consumed, the entire structural component must be replaced, meaning maintenance is complicated and the costs are high.

Further, in the case of the reverse current absorption body disclosed in Patent Document 1, because a separate substrate must be provided, this causes an increase in the material costs.

Moreover, in Patent Document 1 and Patent Document 2, because a thin film-like reverse current absorption layer is used, the amount of the reverse current absorption material is small. As a result, the reverse current absorption performance is low, and when a large reverse current occurs due to the size increase of the electrolyzer mentioned above, the preventive effect on cathode oxidation may be insufficient. In order to enable the absorption of more reverse current, the surface area of the reverse current absorption layer and the amount used of the reverse current absorption material must be increased.

However, when the reverse current absorption layer is formed using a structural component of the cell as a substrate, because the surface area of the substrate is limited, increasing the amount of the reverse current absorption material is difficult.

On the other hand, when the reverse current absorption body of Patent Document 1 is used, the substrate surface area must be increased to increase the amount of the reverse current absorption material. However, this results in a significant increase in material costs. Moreover, in order to ensure satisfactory reverse current absorption, the region occupied by the reverse current absorption body inside the cathode chamber increases, and there is a possibility that the electrolysis may be affected. Further, from the viewpoint of the capacity of the cathode chamber, there is a limit to the size of reverse current absorption body that can be installed, which is still not entirely satisfactory for application within an electrolyzer.

The present invention has been developed in light of the above circumstances, and has an object of providing an electrode for electrolysis that has excellent durability against reverse current, and an electrolyzer provided with the electrode. Further, the present invention also has an object of providing a method that enables production of the electrode for electrolysis at low cost.

Solution to Problem

A first aspect of the present invention is an electrode for electrolysis that includes a conductive substrate on which a catalyst layer is formed and a reverse current absorption body that is coupled to the conductive substrate in a detachable manner, wherein the reverse current absorption body is formed from a sintered compact containing nickel.

In the first aspect of the present invention, the reverse current absorption body is preferably coupled to an end portion of the conductive substrate.

Further, in the first aspect of the present invention, the nickel content in the sintered compact containing nickel is preferably from 45 to 90% by mass.

Moreover, in the first aspect of the present invention, the density of the reverse current absorption body is preferably from 2.00 to 6.51 g/cm$^3$.

A second aspect of the present invention is a method for producing the electrode for electrolysis of the first aspect, the method including a sintered compact formation step of obtaining the sintered compact by sintering a raw material powder composed of any one of Raney nickel alloy particles containing nickel and an alkali-soluble metal element, metallic nickel particles, and a mixture of Raney nickel alloy particles and metallic nickel particles, and a coupling step of coupling the sintered compact to the conductive substrate.

The second aspect of the present invention preferably also includes a post-coupling immersion step of immersing the sintered compact that has been coupled to the conductive substrate in the coupling step in an electrolyte containing an alkali metal hydroxide.

Further, the second aspect of the present invention preferably also includes a pre-coupling immersion step of immersing the sintered compact obtained in the sintered compact formation step in a solution containing an alkali metal hydroxide, wherein the sintered compact that has been subjected to the pre-coupling immersion step is then coupled to the conductive substrate in the coupling step.

A third aspect of the present invention is an electrolyzer having an anode, an anode chamber housing the anode, a cathode, a cathode chamber housing the cathode, and a diaphragm that separates the anode chamber and the cathode chamber, wherein at least one of the cathode and the anode is the electrode for electrolysis of the first aspect.

Effects of Invention

According to the present invention, by using a reverse current absorption body formed from a sintered compact containing nickel, a high discharge capacity can be obtained. In other words, the reverse current absorption body according to the present invention is able to adequately improve the reverse current resistance of the electrode for electrolysis even in small volume. Further, because a substrate is not required, the material costs can be reduced. Moreover, compared with a thin film-like reverse current absorption layer, the reverse current absorption body according to the present invention can be produced extremely easily.

The reverse current absorption body of the present invention can be easily attached to and removed from the substrate, and can therefore be coupled to the substrate in a location appropriate for the electrode shape and the electrolyzer specifications. Further, the reverse current absorption body also offers the advantage of being easy to replace during maintenance.

DESCRIPTION OF THE EMBODIMENTS

Embodiments and reference embodiments of the present invention are described below with reference to the drawings. However, the descriptions below and the drawings are merely examples, and the present invention should not be interpreted as being limited to these examples. Embodiments having variations including all manner of design modifications are also included within the scope of the present invention, provided they exhibit the effects described in each of the embodiments and reference embodiments.

Figure 1:
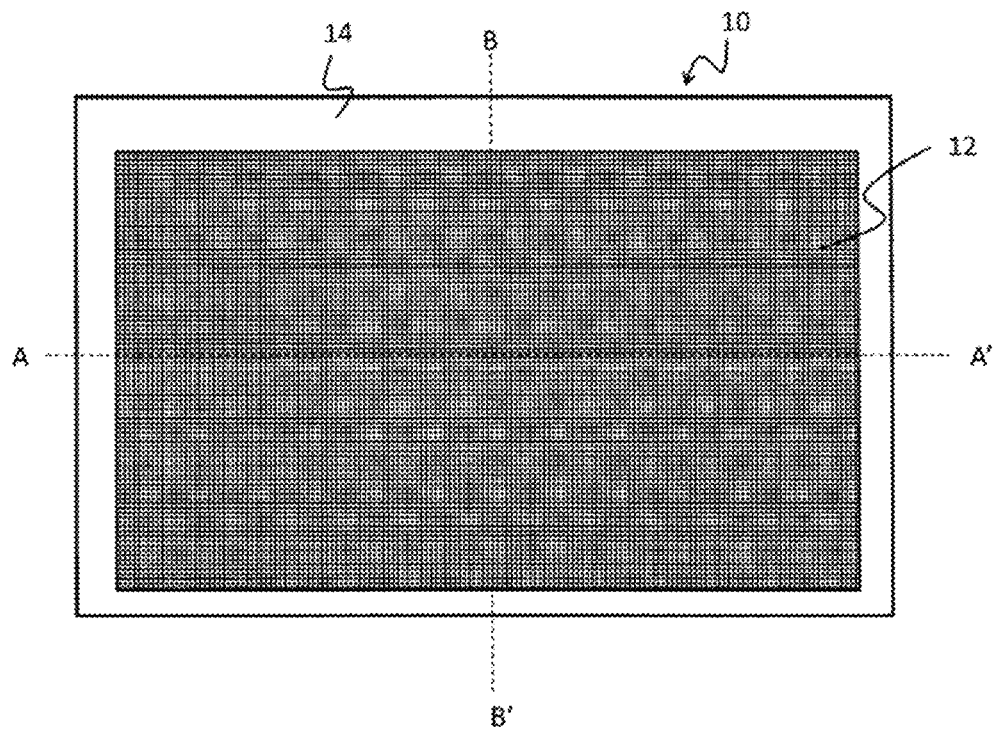
FIG. 1 is a front schematic view describing one example of an electrolytic cell.

FIG. 1 is a front schematic view describing one example of an electrolytic cell used in an alkali metal aqueous solution electrolytic apparatus. "Alkali metal aqueous solution electrolysis" is a generic term for electrolysis that uses an aqueous solution containing alkali metal ions as an electrolyte. This includes, for example, electrolysis of an electrolyte containing an alkali metal chloride (alkali chloride electrolysis) such as brine electrolysis, an alkaline water electrolysis, and electrolysis of an electrolyte containing an alkali metal sulfate (alkali sulfate electrolysis).

The external appearance (front view) of an electrolytic cell 10 is common to each of the embodiments and reference embodiments described below. The electrolytic cell 10 has a gasket 14 composed of a rectangular-shaped frame. An electrode (anode or cathode) 12 is positioned within the open portion of the gasket 14. Although not shown in FIG. 1, a supply nozzle for supplying an electrolyte into the interior of the electrolytic cell 10, and a discharge nozzle for discharging the electrolyte inside the electrolytic cell 10 to an external location are attached to the electrolytic cell 10.

When a plurality of the electrolytic cells 10 are housed inside an electrolyzer, the cells are arranged so that the cathode and anode of adjacent electrolytic cells oppose one another, and a diaphragm is provided between the electrolytic cells.

[First Embodiment]

Figure 2:
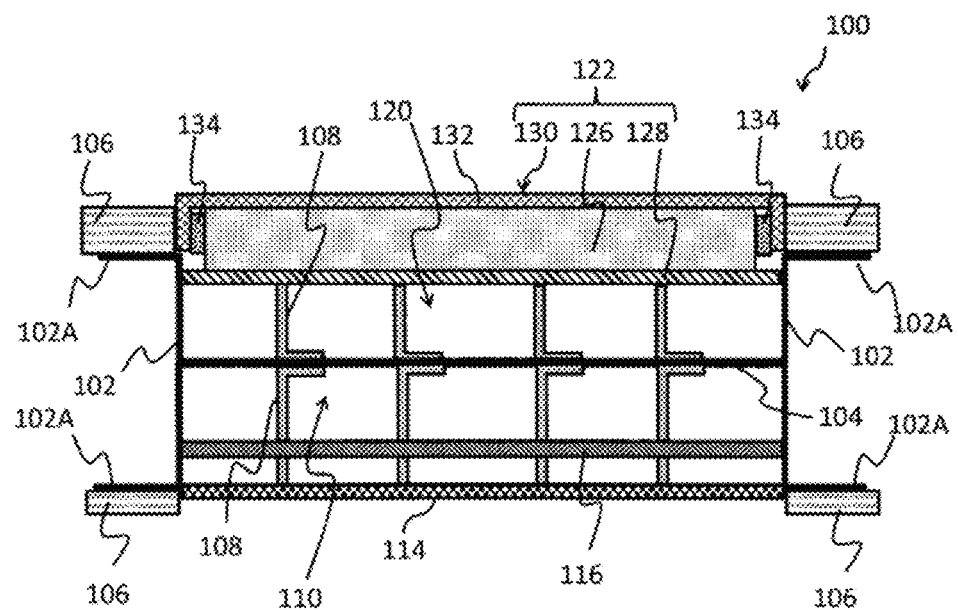
FIG. 2 is a diagram describing an electrolytic cell of a first embodiment, and illustrates a cross-section along A-A' in FIG. 1.

A first embodiment of the present invention is described using a bipolar brine electrolytic apparatus. FIG. 2 illustrates an electrolytic cell used in the brine electrolytic apparatus, and illustrates a cross-sectional view along A-A' in FIG. 1 (a horizontal cross-sectional view).

In an electrolytic cell 100 in the first embodiment, an anode chamber 110 and a cathode chamber 120 are demarcated inside the electrolytic cell 100 by a frame body. In the electrolytic cell 100 of FIG. 2, this frame body is composed of a frame-like frame 102 and a partition wall 104 that partitions the interior of the frame 102, with the frame 102 and the partition wall 104 forming the anode chamber 110 and the cathode chamber 120 inside the electrolytic cell 100. The frame 102 has gasket-bearing surfaces 102A that protrude outward from the frame 102. The gasket-bearing surfaces 102A and the gasket 106 are joined together by fastening means (not shown in the drawing).

An anode 114 is installed in the open portion within the frame 102 of the anode chamber 110. A plurality of support members (ribs) 108 are attached to the partition wall 104, and the anode 114 is supported by these support members 108. The anode 114 is a metal electrode having a catalyst layer formed on the surface of a conductive substrate. The conductive substrate of the anode 114 is formed from titanium, and is a member having a plurality of through holes, such as an expanded mesh, punched metal, or wire gauze or the like. Known metals such as ruthenium, platinum, iridium and titanium, or oxides of these metals, can be used for the catalyst of the anode 114. A buffer plate 116 is installed inside the anode chamber 110. The buffer plate 116 promotes liquid circulation inside the anode chamber 110, and has the role of facilitating a uniform concentration distribution for the electrolyte inside the anode chamber.

A cathode structure 122 is installed inside the cathode chamber 120. The cathode structure 122 includes a cathode 130, a cathode current collector 128 and an elastic body 126. As illustrated in FIG. 2, the cathode 130 is positioned within the open portion of the frame 102. The cathode current collector 128 is positioned opposing the cathode 130, and is located closer to the partition wall 104 than the cathode 130. The elastic body 126 is disposed between the cathode 130 and the cathode current collector 128. The cathode 130 and the elastic body 126 contact each another, and the elastic body 126 and the cathode current collector 128 contact each other. As a result, the cathode 130 and the cathode current collector 128 are connected electrically via the elastic body 126.

A plurality of support members 108 are also attached to the partition wall 104 inside the cathode chamber 120, and the cathode current collector 128 is supported by these support members 108. As a result, the cathode 130 is supported by the support members 108, via the cathode current collector 128 and the elastic body 126. In the case of an electrolyzer having a structure that lacks the partition wall, the support members may be attached to the frame body (frame) or the like. FIG. 2 illustrates a structure having a cathode structure, but in a case where the cathode current collector and elastic body are absent, the cathode may be supported directly by the support members. The support members 108 may be integrated with the cathode current collector 128 and the elastic body 126, or may be integrated with the cathode.

The cathode current collector 128 is a member composed of nickel or a nickel alloy or the like. There are no particular limitations on the form of the cathode current collector 128, which may be mesh-like or plate-like.

The elastic body 126 has the roles of supplying electricity to the cathode 130, as well as pressing the cathode 130 against the diaphragm when a plurality of electrolytic cells 100 are arranged in alignment, thereby closing the distance between the cathode 130 and the anode 114 of the adjacent electrolytic cell 100. By reducing the distance between the anode 114 and the cathode, the voltage can be reduced and the power consumption can be lowered when the plurality of electrolytic cells 100 are aligned. Examples of materials that can be used as the elastic body 126 include non-rigid members such as woven fabric, nonwoven fabric or meshes formed from fine metal wires, as well as plate-like springs, spiral springs, and coiled cushions and the like. The elastic body 126 is formed from a metal material such as nickel, a nickel alloy, or silver or the like, which has a low specific resistance and exhibits excellent corrosion resistance relative to alkali.

The cathode 130 in the present embodiment is composed of a conductive substrate 132 and a reverse current absorption body 134. The end portions of the conductive substrate 132 are bent toward the interior of the cathode chamber 120.

A catalyst layer is formed on the surface of the conductive substrate 132. The catalyst layer contains a noble metal such as platinum, ruthenium, iridium, rhodium, palladium or silver, or an oxide of one of these noble metals. The catalyst layer may also contain an alloy which, in addition to one of the above noble metals, includes an element such as nickel, cerium, lanthanum, praseodymium, rhodium or palladium, or may contain an oxide of such an alloy. Specific examples of the catalyst layer include Ru—La—Pt-based, Ru—Ce-based, Pt—Ni-based, Ru—Pr-based, Pt—Ru—Pr-based, Pt—Pd—Pr-based, Pt—Rh—Pd—Pr-based and Pt—Ce-based materials. The substrate of the conductive substrate 132 is formed from nickel or a nickel alloy, and is a member having a plurality of through holes, such as an expanded mesh, punched metal, or wire gauze or the like.

The reverse current absorption body 134 is coupled so as to directly contact the conductive substrate 132. A plurality of reverse current absorption bodies 134 may be provided for a single conductive substrate 132. The number of reverse current absorption bodies 134 installed is determined in accordance with the requirements specification of the electrolyzer.

There are no particular limitations on the location in which the reverse current absorption body 134 is installed. In the example in FIG. 2, the reverse current absorption bodies 134 are disposed at the end portions of the conductive substrate 132. In the example in FIG. 2, the end regions of the conductive substrate 132 are bent, and the reverse current absorption bodies 134 are installed within these bent portions that face the gasket 106.

Figure 3:
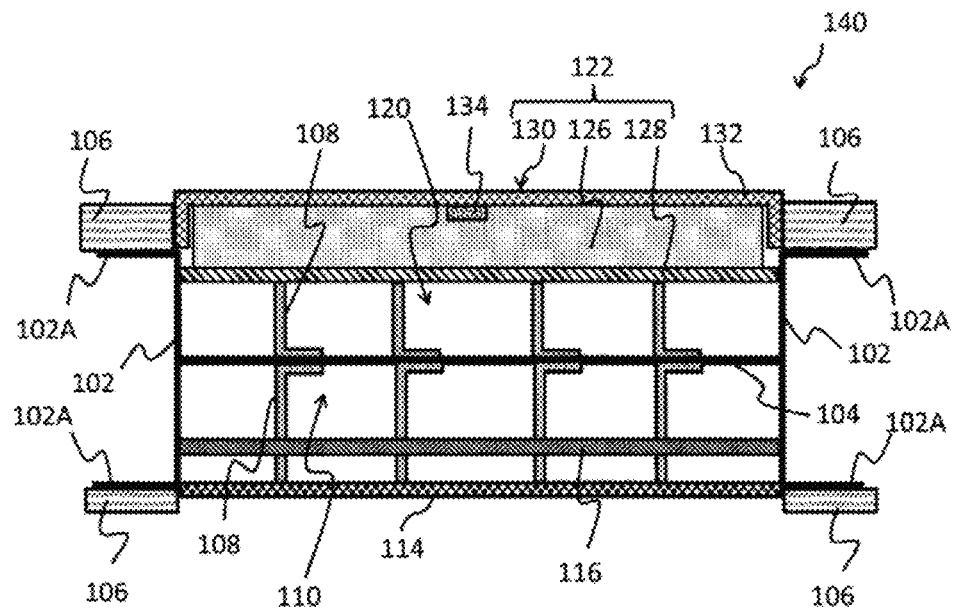
FIG. 3 is a diagram describing an electrolytic cell of another example of the first embodiment, and illustrates a cross-section along A-A' in FIG. 1.

FIG. 3 illustrates an electrolytic cell 140 of another example of the present embodiment, wherein the reverse current absorption body 134 is disposed in a region other than the end portions of the conductive substrate 132, such as the central portion of the conductive substrate 132. In this case, the reverse current absorption body 134 may be sandwiched between the cathode 130 and the elastic body 126. Although dependent on the size and number of reverse current absorption bodies 134, installing the reverse current absorption bodies 134 at the end portions of the conductive substrate 132, namely in regions close to the edges of the conductive substrate 132, reduces inhibition of the circulation of the electrolyte and lowers the possibility of any adverse effects on the state of the electrolysis, and is consequently preferred.

The reverse current absorption body 134 is coupled to the conductive substrate 132 to form an integrated body. In the present embodiment, the reverse current absorption body 134 is coupled to the conductive substrate 132 in a detachable manner. The reverse current absorption body 134 is connected electrically to the conductive substrate 132.

The reverse current absorption body 134 may be welded to the conductive substrate 132. In this case, the two members are preferably partially joined by spot welding or the like. The reverse current absorption body 134 may also be secured to the conductive substrate 132 by a wire material such as metallic wire. The reverse current absorption body 134 may also be coupled to the conductive substrate 132 by sandwiching the reverse current absorption body 134 between the conductive substrate 132 and the elastic body 126. The reverse current absorption body 134 may also be coupled to the conductive substrate 132 by curving the edge portions of the conductive substrate 132, and wrapping the reverse current absorption body 134 in the curved portions.

Alternatively, the reverse current absorption body 134 may be coated with a wire gauze such as a woven mesh that is coupled to the conductive substrate 132 by one of the methods described above. In this case, a good electrical connection is maintained between the conductive substrate 132 and the reverse current absorption body 134.

The reverse current absorption body 134 is formed from a sintered compact containing nickel, which is a less-noble metal than the catalyst layer of the cathode. In other words, the reverse current absorption body 134 of the present embodiment is composed only of a sintered compact, and unlike Patent Document 1 and Patent Document 2, a substrate used for supporting a layer having reverse current absorption performance is not required.

Reverse current is an electric current which, when electrolysis is stopped, flows in the reverse direction to the current during electrolysis. When a reverse current flows, the potential increases while a variety of oxidation reactions proceed at the cathode, with those reactions of lower redox potential occurring first. The equilibrium potential of the oxidation reaction of the cathode catalyst material is more noble than the equilibrium potential of the oxidation reaction of nickel. For example, when ruthenium is used as the catalyst material, reverse current causes oxidation reactions to proceed in the following order.

$$H_{ad}(\text{atomic hydrogen adsorbed to the electrode surface}) + OH^- \rightarrow H_2O + e^- \quad (1)$$

$$Ni + 2OH^- \rightarrow Ni(OH)_2 + 2e^- \quad (2)$$

$$Ru + 4OH^- \rightarrow RuO_2 + 2H_2O + 4e^- \quad (3)$$

$$RuO_2 + 4OH^- \rightarrow RuO_4^{2-} + 2H_2O + 2e^- \quad (4)$$

During the period while a single oxidation reaction proceeds, the potential is maintained at a constant value. Accordingly, following completion of the oxidation reaction (1) of adsorbed hydrogen generated by electrolysis and the oxidation reaction (2) of the nickel in the reverse current absorption body, the oxidation reaction (3) of ruthenium and then an elution reaction (4) of the catalyst (ruthenium) occur. In the present description, the electric capacity of the period up until completion of the reactions (1) and (2) is defined as the discharge capacity.

As is evident from the above description, the larger the amount of atomic hydrogen adsorbed to the electrode surface and the larger the amount of nickel, the greater the amount of reverse current consumed by the reactions (1) and (2). This state is called "reverse current absorption".

The reverse current absorption body 134 is a bulk material. Compared with the reverse current absorption bodies of Patent Document 1 and Patent Document 2 which have a thin-film reverse current absorption layer formed on a substrate, a reverse current absorption body 134 of a similar size has a much larger amount of the component (mainly Ni) that contributes to reverse current absorption. Accordingly, the reverse current absorption body 134 of the present embodiment has superior reverse current absorption performance. Although ruthenium is relatively inexpensive, it dissolves extremely easily in alkali upon anodic polarization. As a result, it can be said to be a material that is susceptible to reverse current. The reverse current absorption body 134 of the present embodiment is able to satisfactorily suppress cathode degradation even when ruthenium is used as a catalyst.

There are no particular limitations on the shape of the reverse current absorption body 134. The reverse current absorption body 134 may have a prismatic, flat plate-like, or rod-like shape, and may have grooves or the like formed therein to facilitate coupling to the conductive substrate 132 or as a result of the production specifications. However, when the reverse current absorption body 134 is formed with a thin plate-like shape, the installation area increases. This can cause various problems as the number of reverse current absorption bodies that can be installed is more limited, the reverse current absorption performance for the overall electrolyzer decreases, and circulation of the electrolyte is more likely to be inhibited by the reverse current absorption body. Further, a thin plate-like reverse current absorption body may also suffer from strength problems. For bodies having the same projected surface area, a thicker reverse current absorption body has a greater nickel content, and therefore has a larger discharge capacity. However, in the case of a thick reverse current absorption body, the electrolyte is unable to penetrate into the interior of the body, meaning the internal Ni is unable to contribute to the reverse current absorption performance. Further, in the case of a thick reverse current absorption body, the installation space required inside the cathode chamber increases. For these reasons, there is an upper limit for the thickness of the reverse current absorption body. The optimal value for the thickness of the reverse current absorption body 134 differs depending on the size of the electrolyzer, and the size and shape of the reverse current absorption body. The thickness of the reverse current absorption body 134 is determined with due consideration of the factors described above.

Examples of the raw material powder for the reverse current absorption body 134 (nickel-containing sintered compact) include metallic nickel particles, Raney nickel alloy particles, and mixtures of the two. A "Raney nickel alloy" contains an alkali-soluble metal element (Al, Si, Sn, Zn) and nickel. Examples of Raney nickel alloys that may be used in the present embodiment include binary alloys such as Ni—Al and Ni—Si, as well as multicomponent alloys containing one or more added metal elements such as Ru, Co, Ti, Mn, Cu, Fe and Mo besides the nickel and the alkali-soluble metal element.

An aluminum stearate such as aluminum tristearate may be added to the raw material powder as an additive.

The size of the metallic nickel particles is one factor that affects the performance (discharge capacity) of the reverse current absorption body 134. The size of the metallic nickel particles, reported as an average particle size measured using a FSSS (Fischer sub-sieve sizer), is preferably at least 0.13 μm but not more than 50 μm, more preferably at least 0.2 μm but not more than 10 μm, and most preferably at least 2 μm but not more than 5 μm. When the metallic nickel particles are small, the specific surface area of the sintered compact increases and the discharge capacity increases, which is beneficial. However, if the particles are too small, then the sintered compact becomes excessively dense, making it more difficult for the electrolyte to penetrate into the interior of the sintered compact. As a result, the portion of the compact that contributes to the discharge reaction decreases and the discharge capacity decreases. On the other hand, if the metallic nickel particles are larger than the particle size range described above, then the specific surface area decreases, causing a reduction in the discharge capacity.

Further, the nickel content in the reverse current absorption body 134 is preferably from 45 to 90% by mass. Provided the nickel content falls within this range, the shape of the reverse current absorption body 134 can be maintained even after the immersion step, and a high discharge capacity exceeding 1.5 mF/g (10 F/m$^2$) can be obtained. From the viewpoint of durability, this nickel content is more preferably from 53 to 90% by mass. Moreover, if consideration is given to the reverse current absorption performance, then the nickel content is even more preferably from 53 to 87.5% by mass, and is most preferably from 53 to 77.5% by mass.

Further, the density of the reverse current absorption body 134 is preferably from 2.00 to 6.51 g/cm$^3$. Provided the density falls within this range, the shape of the reverse current absorption body 134 can be maintained even after the immersion step, and a high discharge capacity exceeding 1.5 mF/g (10 F/m$^2$) can be obtained. From the viewpoint of durability, this density is more preferably from 2.30 to 6.51 g/cm$^3$. Moreover, if consideration is given to the reverse current absorption performance, then the density is even more preferably from 2.30 to 5.95 g/cm$^3$, and is most preferably from 2.30 to 5.10 g/cm$^3$.

In the present embodiment, there are no particular limitations on the shape of the Raney nickel alloy particles and the metallic nickel particles, and particles of all manner of shapes including spherical, spheroidal, polyhedral and irregular shapes can be used.

The reverse current absorption body 134 is formed by the steps described below.

The raw material powder described above is molded into a prescribed shape in accordance with the required specifications. Because the molding pressure is a parameter that affects the sinterability and the porosity of the sintered compact, the external appearance (including the presence or absence of cracks) and the discharge capacity and the like of the sintered compact can be altered by altering the molding pressure. Particularly in those cases where the raw material powder is composed of only metallic nickel particles, or composed of a mixture in which the proportion of metallic nickel particles is large, cracking may occur during sintering depending on the molding pressure. Similarly, in those cases where the raw material powder is composed of Raney nickel alloy particles, cracking may occur during sintering depending on the molding pressure. Following molding of the raw material powder, the molded body is sintered (in the sintered compact formation step). Examples of molding methods that may be used include conventional methods such as press molding and cold isostatic pressing methods, as well as metal powder injection molding and extrusion molding methods.

In the present embodiment, rather than using the formation steps described above, a conventional method such as a hot press method, hot isostatic press method or spark plasma sintering method may be used to form the molded body while sintering is performed.

The sintering conditions (such as the sintering temperature and sintering time) may be set appropriately in accordance with the sinterability and the desired external appearance for the sintered compact and the like.

The obtained sintered compact is coupled to the conductive substrate 132 using the types of means described above (the coupling step). In the present embodiment, the sintered compact may be immersed in an alkali solution following sintering and then coupled to the conductive substrate 132 (production step A described below), or following sintering, the sintered compact may be coupled, as is, to the conductive substrate 132 (production step B described below).

(Production Step A)

In the production step A, following sintering, the sintered compact is immersed in an aqueous solution containing an alkali metal hydroxide (such as NaOH or KOH) (pre-coupling immersion step). This pre-coupling immersion step elutes any alkali-soluble components (alkali-soluble metal elements) near the surface of the sintered compact. The immersion conditions may be set appropriately in accordance with the size of the reverse current absorption body, the elution rate of the alkali-soluble components, and the desired immersion time and the like. For example, the elution conditions may include an immersion temperature of 25° C. (room temperature) to 100° C., an alkali (NaOH) concentration of 1 to 40 wt %, and an immersion time of 1 to 24 hours.

The sintered compact that has been subjected to the pre-coupling immersion step is coupled as the reverse current absorption body 134 to the conductive substrate 132 of the cathode 130. The method used for the coupling is as described above.

This cathode 130 forms the cathode structure 122 in combination with the cathode current collector 128 and the elastic body 126. This cathode structure 122 is incorporated into the electrolytic cell 100, and the electrolytic cell 100 is housed inside the electrolyzer.

Because the reverse current absorption body of the present embodiment is a bulk material, alkali-soluble components remain within the interior of the reverse current absorption body even after the elution step. When this reverse current absorption body is incorporated into an electrolytic cell and electrolysis is performed, the alkali-soluble components are eluted into the electrolyte over long periods of operation. In the production step A, because the reverse current absorption body is incorporated into the electrolyzer after the alkali-soluble components at the surface of the reverse current absorption body have already been removed, the amount of impurities incorporated within the product can be reduced. This production step is effective in those cases where a high-purity product (sodium hydroxide) is required, and in those cases where the amount of Raney nickel alloy particles in the raw material powder is large.

(Production Step B)

In the production step B, the sintered compact is coupled to the conductive substrate 132 without performing the pre-coupling immersion step described above in the production step A. The coupling method is as described above. The conductive substrate 132 with the attached sintered compact is combined with the cathode current collector 128 and the elastic body 126 to form the cathode structure 122. This cathode structure 122 is incorporated into the electrolytic cell 100, and then housed inside the electrolyzer.

In the case of two adjacent electrolytic cells, the anode chamber 110 of one electrolytic cell is disposed opposing the cathode chamber 120 of the other electrolytic cell. A diaphragm (for example, an ion exchange membrane) is disposed between the two adjacent electrolytic cells. In other words, the anode chamber 110 and the cathode chamber 120 of the two adjacent electrolytic cells are separated by the diaphragm.

In the case of a brine electrolytic apparatus, a sodium hydroxide aqueous solution is supplied to the cathode chamber 120 as an electrolyte, and an electrolyte containing sodium chloride is supplied to the anode chamber 110. Electrolysis is started after the cathode 130 and the anode 114 have been immersed in these respective electrolytes.

Inside the electrolyzer, the sintered compact (the reverse current absorption body 134) is immersed in an electrolyte containing an alkali metal hydroxide (post-coupling immersion step). The alkali-soluble components in the sintered compact (the reverse current absorption body 134) (namely, the alkali-soluble components in the Raney nickel alloy) are eluted into the sodium hydroxide aqueous solution of the electrolyte (the electrolyte containing an alkali metal hydroxide). Hydrogen is generated as a result of this elution reaction. The eluted portions become voids. As the electrolysis continues, alkali-soluble metal continues to be eluted from the sintered compact into the electrolyte.

Hydrogen is generated as a result of this elution reaction of the alkali-soluble components. This hydrogen adsorbs to the surface of the sintered compact, and as a result of the reaction shown above in the reaction formula (1), even the sintered compact itself immediately following sintering has a reverse current absorption performance. Moreover, because voids are formed as a result of the immersion in the alkaline electrolyte, the electrolyte is able to penetrate more easily into the interior of the reverse current absorption body 134, yielding an improvement in the reverse current absorption performance (discharge capacity).

The amount of alkali-soluble components eluted from the sintered compact is greatest immediately after immersion, and gradually decreases as time passes. In the case of brine electrolysis, the sodium hydroxide produced in the cathode chamber is collected as a product, and therefore the eluted alkali-soluble components become impurities within the product. The production step B can be employed in those cases where the reverse current absorption body 134 is formed solely from metallic nickel particles, or in cases where a product of lower purity is permissible.

The above embodiment was described using a bipolar brine electrolytic apparatus as an example, but the same effects can be obtained with a monopolar brine electrolytic apparatus. Furthermore, the structure of the present embodiment can also be applied to an alkali sulfate electrolytic apparatus.

[Second Embodiment]

Figure 4:
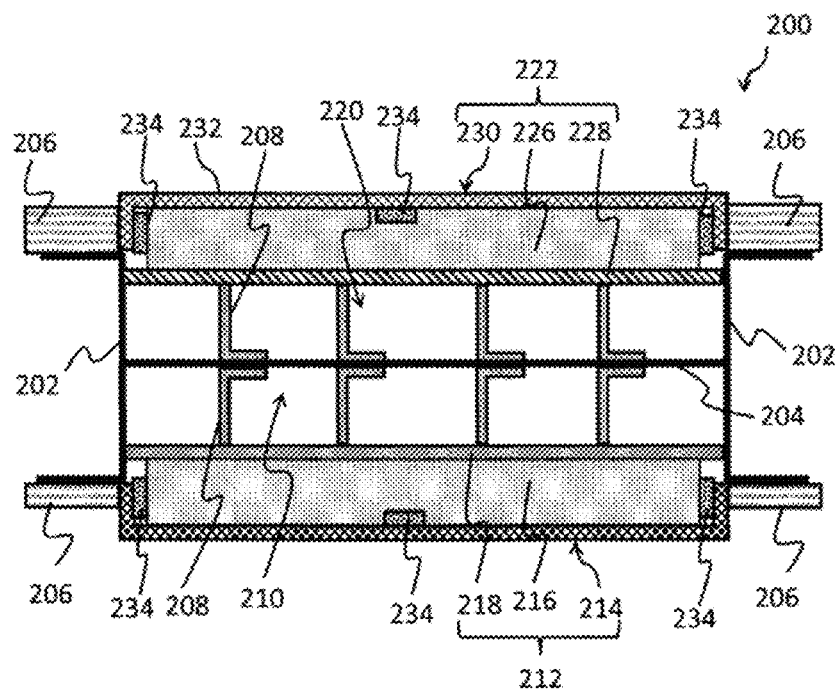
FIG. 4 is a diagram describing an electrolytic cell of a second embodiment, and illustrates a cross-section along A-A' in FIG. 1.

A second embodiment of the present invention is described using an alkaline water electrolytic apparatus. FIG. 4 illustrates an electrolytic cell used in the alkaline water electrolytic apparatus, and illustrates a cross-sectional view along A-A' in FIG. 1 (a horizontal cross-sectional view).

In a similar manner to the first embodiment, an anode chamber 210 and a cathode chamber 220 are demarcated inside the electrolytic cell 200 by a frame body. The inside of the electrolytic cell 200 in FIG. 4 is divided into the anode chamber 210 and the cathode chamber 220 by a frame-like frame 202 of the frame body and a partition wall 204. The frame 202 and a gasket 206 are joined together by fastening means (not shown in the drawing).

In the second embodiment, the electrode structures on the anode side and the cathode side are substantially the same. In other words, inside the cathode chamber 220 is installed a cathode structure 222 containing a cathode 230, a cathode current collector 228 and a cathode-side elastic body 226. Inside the anode chamber 210 is installed an anode structure 212 containing an anode 214, an anode current collector 218 and an anode-side elastic body 216. A plurality of support members (ribs) 208 are attached to both the anode side and the cathode side of the partition wall 204, with the anode structure 212 and the cathode structure 222 supported by these support members 208. Accordingly, the cathode 230 is supported by the support members 208 via the cathode current collector 228 and the elastic body 226. Further, the anode 214 is supported by the support members 208 via the anode current collector 218 and the elastic body 216. In the case of an electrolyzer having a structure that lacks the partition wall, the support members may be attached to the frame body (frame) or the like. FIG. 4 illustrates a structure having a cathode structure and an anode structure, but in a case where the cathode current collector, the anode current collector and the elastic bodies are absent, the cathode and the anode may be supported directly by the support members. The support members may be integrated with the cathode current collector, the anode current collector and the elastic bodies, or may be integrated with the cathode and the anode respectively. The anode 214 and the cathode 230 are each disposed in the open portion of the frame 202.

The anode 214 is a metal electrode having a catalyst layer formed on the surface of a conductive substrate. The conductive substrate of the anode 214 is formed from nickel or a nickel alloy, and is a member having a plurality of through holes, such as an expanded mesh, punched metal, or wire gauze or the like. Conventional catalysts can be used for the anode 214, including noble metals such as platinum and iridium, oxides of these metals, Raney nickel alloys, porous nickel, and nickel-cobalt-based oxides (composite oxides of nickel and cobalt, and oxides obtained by doping these types of composite oxides with manganese or rare earth elements).

For the anode current collector 218 and the anode-side elastic body 216, the same materials as those described for the cathode current collector and the elastic body of the first embodiment can be used. The support members 208 may be integrated with the anode current collector 218 and the elastic body 216.

The cathode structure 222 (the cathode 230, the cathode current collector 228, and the elastic body 226) is the same as that described for the first embodiment. As was the case in the first embodiment, the support members 208 may be integrated with the cathode current collector 228 and the elastic body 226 in the second embodiment.

In the second embodiment, a reverse current absorption body 234 similar to that described in the first embodiment is installed on at least one of the anode side and the cathode side. The reverse current absorption body 234 is coupled to the anode 214 or the conductive substrate 232 of the cathode 230. The reverse current absorption body 234 is coupled to the conductive substrate in a detachable manner. As a result of this coupling, a reverse current absorption body 234 is connected electrically to each of the electrodes (the anode 214 and the cathode 230). In a similar manner to the first embodiment, the reverse current absorption bodies 234 may be coupled to the end portions of the conductive substrate, or may be coupled in a region other than the end portions, such as the central portion of the conductive substrate. The coupling is achieved using similar means to those described in the first embodiment such as securing by wire, welding, or sandwiching between the conductive substrate and the elastic body 216 or 226. Further, the reverse current absorption body 234 may be coated with a wire gauze such as a woven mesh before being coupled to the conductive substrate.

The method used for producing the reverse current absorption body 234 is similar to that described in the first embodiment. In the case of an alkaline water electrolytic apparatus, an alkaline electrolyte (an electrolytic water containing an alkali metal hydroxide) is supplied to both the anode chamber 210 and the cathode chamber 220, and electrolysis is performed. Accordingly, in the case of the production step B, the reverse current absorption bodies 234 are immersed in the electrolytes and undergo elution of the alkali-soluble components inside both the anode chamber 210 and the cathode chamber 220.

Further, elution of alkali-soluble components from the reverse current absorption bodies 234 into the electrolyte occurs in both the anode chamber 210 and the cathode chamber 220.

When a reverse current occurs, at the cathode side, the reverse current is absorbed by the reverse current absorption body 234 in accordance with the reactions (1) and (2), thereby suppressing elution of the cathode catalyst.

On the other hand, at the anode side, a reduction reaction (5) of the oxygen generated by electrolysis, and reduction reactions (6) and (7) of the nickel peroxide and nickel oxyhydroxide respectively generated in the reverse current absorption body by electrolysis proceed in the following order, thereby absorbing the reverse current.

$$O_2+2H_2O+4e^-\rightarrow 4OH^-  \quad (5)$$

$$NiO_2+H_2O+e^-\rightarrow NiOOH+OH^-  \quad (6)$$

$$NiOOH+H_2O+e^-\rightarrow Ni(OH)_2+OH^-  \quad (7)$$

By employing the reverse current absorption body 234 of the present embodiment, much of the reverse current can be consumed by the reactions (6) and (7). In the period that the reactions (5), (6) and (7) are occurring, the anode 214 having the same potential as the reverse current absorption body 234 does not undergo cathodic polarization. Even in the case of a catalyst material that is stable during normal electrolysis, if a large cathodic polarization occurs once, then when electrolysis is performed again, anodic polarization can cause elution of the catalyst and a loss of conductivity. Accordingly, by housing the reverse current absorption body 234 of the present embodiment inside the anode chamber 210 of an alkaline water electrolytic apparatus, anode degradation caused by reverse current can be prevented.

In this description, the electric capacity of the period up until completion of the reactions (5), (6) and (7) is defined as the discharge capacity on the anode side.

The second embodiment of the present invention was described using a bipolar alkaline water electrolytic apparatus as an example, but the same effects can be obtained with a monopolar alkaline water electrolytic apparatus.

[First Reference Embodiment]

A first reference embodiment of the present invention is described using a bipolar brine electrolytic apparatus. The effects of this reference embodiment can also be obtained in a monopolar brine electrolytic apparatus or an alkali sulfate electrolytic apparatus.

Figure 5:
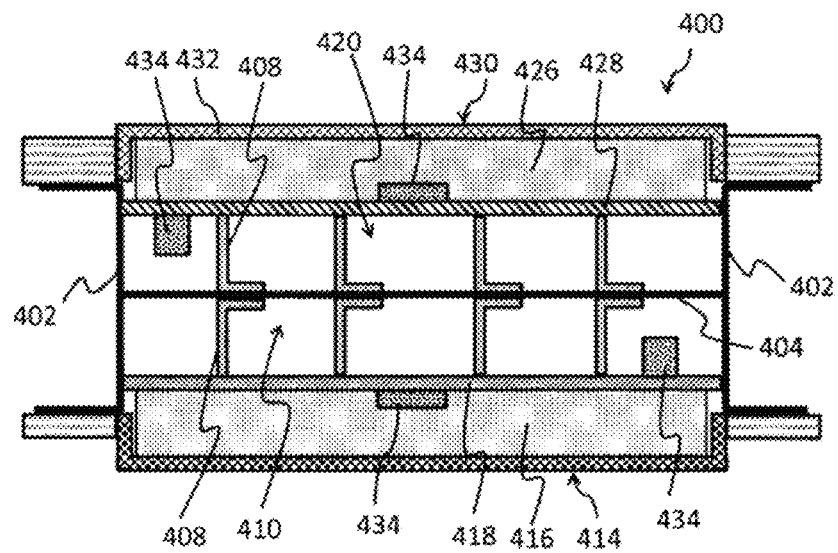
FIG. 5 is a diagram describing an electrolytic cell of a first reference embodiment, and illustrates a cross-section along A-A' in FIG. 1.

FIG. 5 illustrates an electrolytic cell used in the brine electrolytic apparatus of the first reference embodiment, and illustrates a cross-sectional view along A-A' in FIG. 1 (a horizontal cross-sectional view).

With the exception of the installation location for the reverse current absorption body, the first reference embodiment has the same structure as the first embodiment. Accordingly, an anode 314 and a buffer plate 316 disposed inside an anode chamber 310 are the same as those described in the first embodiment.

In an electrolytic cell 300 in the first reference embodiment, a reverse current absorption body 334 of the type described in the first embodiment is coupled to a cathode current collector 328 inside a cathode chamber 320. The reverse current absorption body 334 may be a body that has been immersed in a solution containing an alkali metal hydroxide following sintering, thereby removing alkali-soluble components from regions near the surface. Alternatively, the sintered compact obtained following sintering may be used, as is, as the reverse current absorption body 334, and coupled to the cathode current collector 328.

The reverse current absorption body 334 may be installed on the surface of the cathode current collector 328 on the side facing the cathode 330, or may be installed on the surface on the side facing a partition wall 304 (the surface on the opposite side from the cathode 330). The reverse current absorption body 334 is coupled to the cathode current collector 328 in a detachable manner. The method used for coupling the reverse current absorption body 334 to the cathode current collector 328 may employ similar methods to those described in the first embodiment such as securing by wire or welding. In those cases where the reverse current absorption body 334 is disposed on the cathode-side surface of the cathode current collector 328, the reverse current absorption body 334 can be secured by sandwiching between the cathode current collector 328 and an elastic body 326. Further, the reverse current absorption body 334 may be coated with a wire gauze such as a woven mesh before being coupled to the cathode current collector 328.

As described above in the first embodiment, a conductive substrate 332 of the cathode 330, the elastic body 326, the cathode current collector 328, a frame 302, and supports 308 are formed from metal materials having conductivity. As a result, the cathode 330 and the reverse current absorption body 334 are connected electrically.

When operation of the electrolyzer is stopped and a reverse current is generated, the reactions (1) and (2) proceed. Because the cathode 330 is maintained at the same potential as the reverse current absorption body 334, oxidation reactions at the cathode 330 (the reactions (3) and (4)) do not proceed while the reactions (1) and (2) are occurring, meaning the cathode catalyst is protected.

[Second Reference Embodiment]

Figure 6:
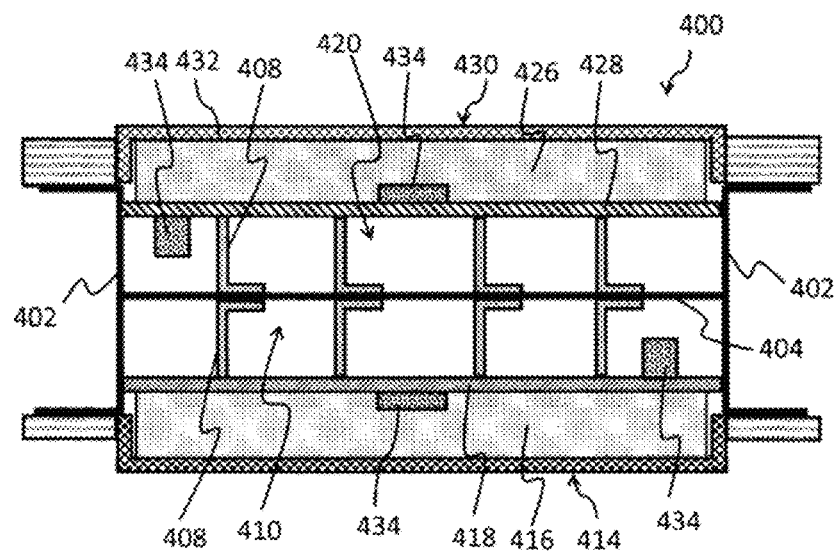
FIG. 6 is a diagram describing an electrolytic cell of a second reference embodiment, and illustrates a cross-section along A-A' in FIG. 1.

A second reference embodiment of the present invention is an alkaline water electrolytic apparatus. FIG. 6 illustrates an electrolytic cell applicable to the second reference embodiment, and illustrates a cross-sectional view along A-A' in FIG. 1 (a horizontal cross-sectional view). FIG. 6 illustrates an example in which the embodiment is applied to a bipolar alkaline water electrolyzer, but this reference embodiment may also be applied to a monopolar electrolyzer.

With the exception of the installation location for the reverse current absorption body, the second reference embodiment has the same structure as the second embodiment.

In an electrolytic cell 400 of the second reference embodiment, a reverse current absorption body 434 of the type described in the first embodiment is coupled to at least one of an anode current collector 418 and a cathode current collector 428. The reverse current absorption body 434 may be a body that has been immersed in advance in a solution containing an alkali metal hydroxide (the production step A), or may be a body that has not been treated following sintering (the production step B).

As illustrated in FIG. 6 the reverse current absorption body 434 may each be located on either a surface on the electrode side (an anode 414 or a cathode 430) or a surface on the side of a partition wall 404. The reverse current absorption bodies 434 are coupled to the anode current collector 418 and the cathode current collector 428 in a detachable manner. The method used for performing the coupling to the anode current collector 418 and the cathode current collector 428 may employ securing by wire, or welding or the like. In those cases where the reverse current absorption body 434 is disposed on the electrode-side surface, the reverse current absorption body 434 may be secured by sandwiching between the anode current collector 418 and an elastic body 416, or between the cathode current collector 428 and an elastic body 426. Further, the reverse current absorption bodies 434 may be coated with a wire gauze such as a woven mesh before being coupled to the anode current collector 418 and the cathode current collector 428.

A conductive substrate 432 of the cathode 430, the elastic body 426, the cathode current collector 428, a frame 402, and support members 408 are formed from metal materials having conductivity. As a result, the cathode 430 and the reverse current absorption body 434 are connected electrically inside a cathode chamber 420.

Further, the anode 414, the elastic body 416 and the anode current collector 418 are formed from metal materials having conductivity. As a result, the anode 414 and the reverse current absorption body 434 are connected electrically inside an anode chamber 410.

As mentioned above, the reverse current absorption bodies 434 are connected electrically to the anode 414 or the cathode 430. Accordingly, when operation of the electrolyzer is stopped and a reverse current is generated, the reactions (1) and (2) proceed at the cathode side. Because the cathode 430 is maintained at the same potential as the reverse current absorption body 434, oxidation reactions do not proceed at the cathode 430 while the reactions (1) and (2) are occurring, meaning the catalyst is protected. Further, the reactions (5), (6) and (7) proceed at the anode side, and because the anode 414 is maintained at the same potential as the reverse current absorption body 434, cathodic polarization does not occur beyond this potential. As a result, when electrolysis is restarted, anode degradation due to catalyst elution or a deterioration in conductivity can be prevented.

[Third Reference Embodiment]

Figure 7:
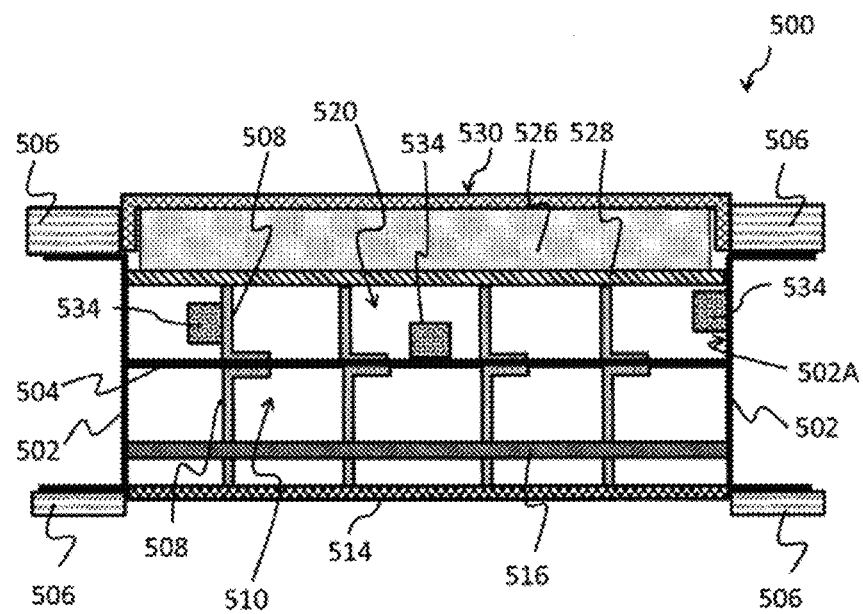
FIG. 7 is a diagram describing an electrolytic cell of a third reference embodiment, and illustrates a cross-section along A-A' in FIG. 1.
Figure 8:
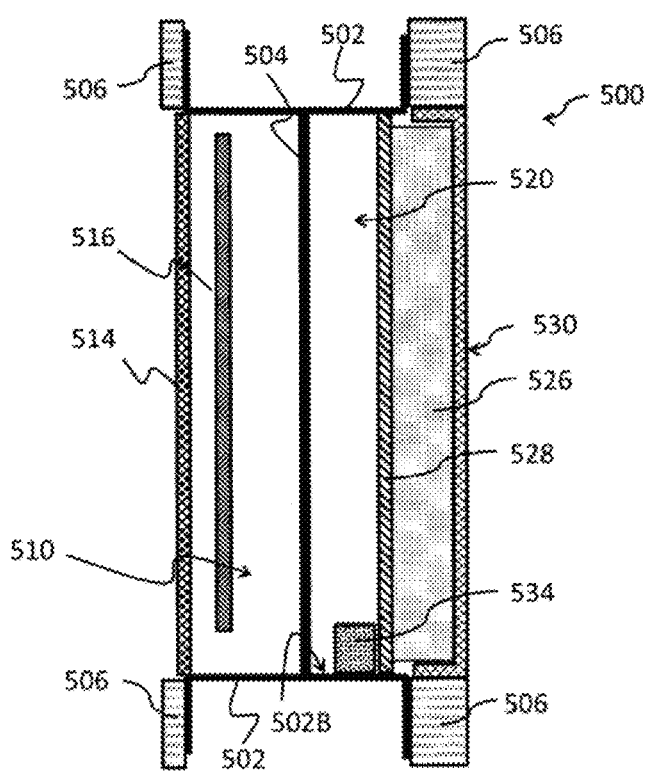
FIG. 8 is a diagram describing an electrolytic cell of the third reference embodiment, and illustrates a cross-section along B-B' in FIG. 1.

A third reference embodiment of the present invention is a brine electrolytic apparatus. FIG. 7 illustrates an electrolytic cell applicable to the third reference embodiment, and illustrates a cross-sectional view along A-A' in FIG. 1 (a horizontal cross-sectional view). FIG. 8 also illustrates an electrolytic cell applicable to the third reference embodiment, and illustrates a cross-sectional view along B-B' in FIG. 1 (a vertical cross-sectional view). FIG. 7 and FIG. 8 illustrate an example in which the embodiment is applied to a bipolar brine electrolyzer, but this reference embodiment may also be applied to a monopolar electrolyzer or an alkali sulfate electrolytic apparatus.

With the exception of the installation location for the reverse current absorption body, the third reference embodiment has the same structure as the first embodiment. Accordingly, an anode 514 and a buffer plate 516 disposed inside an anode chamber 510 are the same as those described in the first embodiment.

In an electrolytic cell 500 in the third reference embodiment, a reverse current absorption body 534 of the type described in the first embodiment is coupled to an electrolytic cell structural member inside a cathode chamber 520. The reverse current absorption body 534 may be a body that has been immersed in advance in a solution containing an alkali metal hydroxide (the production step A), or may be a body that has not been treated following sintering (the production step B).

In the third reference embodiment, the electrolytic cell structural member refers to a member that constitutes part of the electrolytic cell besides a cathode structure (a cathode 530, a cathode current collector 528 and an elastic body 526) and an anode 514, and specific examples of this member include a frame 502, a partition wall 504, a support member (rib) 508, a gasket 506, and a buffer plate 516. However, in those cases where the support members 508 are integrated with the cathode current collector 528 and the elastic body 526, this type of integrated structure is also included within the definition of electrolytic cell structural members.

Accordingly, in the third reference embodiment, reverse current absorption bodies 534 are attached, in a detachable manner, to a surface of the partition wall 504 on the side of the cathode chamber 520, a side wall 502A of the frame 502 on the inside of the cathode chamber, a surface of the frame 502 on a bottom surface 502B (see FIG. 8) of the cathode chamber 520, and a support member 508. In the case of support members 508 that are integrated with the cathode current collector and the elastic body, a reverse current absorption body 534 may also be installed in a position on the support member 508 on the side that contacts the cathode 530, provided it does not impair the function of the elastic body. For example, a spring-like structure or coil-like structure may be formed on the support member 508 as an elastic body that contacts the cathode 530, and a reverse current absorption body 534 may be attached in a location in which the elastic body is not formed.

The reverse current absorption bodies 534 are preferably coupled to the electrolytic cell structural members described above by welding, but may also be attached by metal securing means such as wires, provided the bodies can be secured satisfactorily. Further, the reverse current absorption bodies 534 may be coated with a wire gauze such as a woven mesh before being coupled to the electrolytic cell structural members.

The reverse current absorption bodies 534 and the cathode 530 are connected electrically via the partition wall 504, the frame 502, the support members 508, the cathode current collector 528 and the elastic body 526.

When operation of the electrolyzer is stopped and a reverse current is generated, the cathode 530 is maintained at the same potential as the reverse current absorption bodies 534. As a result, oxidation reactions at the cathode 530 do not occur while the oxidation reactions of the reactions (1) and (2) are proceeding in the reverse current absorption bodies 534, meaning the catalyst is protected.

[Fourth Reference Embodiment]

Figure 9:
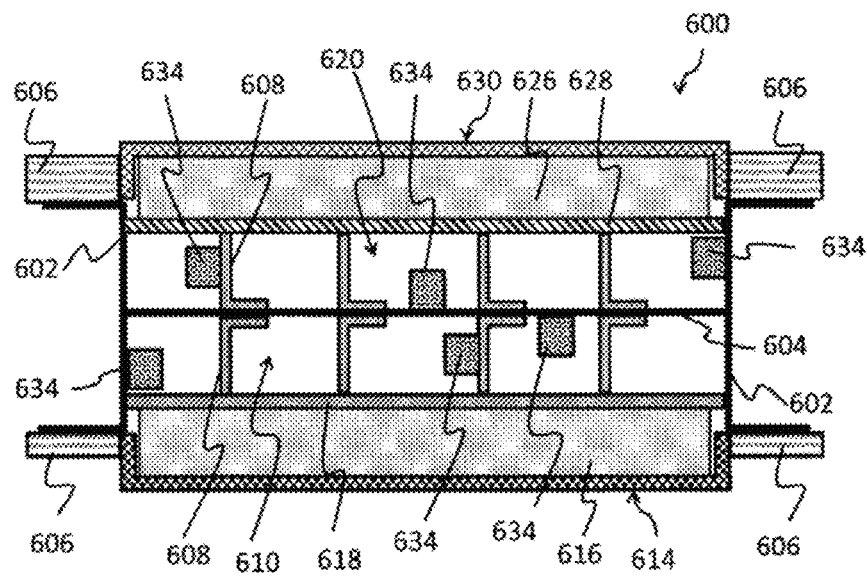
FIG. 9 is a diagram describing an electrolytic cell of a fourth reference embodiment, and illustrates a cross-section along A-A' in FIG. 1.

A fourth reference embodiment of the present invention is an alkaline water electrolytic apparatus. FIG. 9 illustrates an electrolytic cell applicable to the fourth reference embodiment, and illustrates a cross-sectional view along A-A' in FIG. 1 (a horizontal cross-sectional view). FIG. 9 illustrates an example in which the embodiment is applied to a bipolar alkaline water electrolyzer, but this reference embodiment may also be applied to a monopolar electrolyzer.

With the exception of the installation location for the reverse current absorption bodies, the fourth reference embodiment has the same structure as the second embodiment. In an electrolytic cell 600 in the fourth reference embodiment, reverse current absorption bodies 634 of the type described in the first embodiment are coupled to electrolytic cell structural members inside an anode chamber 610 and a cathode chamber 620. In the fourth reference embodiment, the electrolytic cell structural members refer to members that constitute part of the electrolytic cell besides a cathode structure (a cathode 630, a cathode current collector 628 and an elastic body 626) and an anode structure (an anode 614, an anode current collector 618 and an elastic body 616), and specific examples of these members include a frame 602, a partition wall 604, support members (ribs) 608, and a gasket 606. Accordingly, the reverse current absorption bodies 634 are attached to the partition wall 604, the inner wall surface of the frame 602, the bottom surface of the frame (not shown in FIG. 9), and the support members 608. The reverse current absorption bodies 634 may be installed in only one of the anode chamber 610 and a cathode chamber 620, or may be installed in both chambers.

In this embodiment, the support members 608 may be integrated with the cathode current collector and the elastic body, or integrated with the anode current collector and the elastic body, and these types of integrated structures are also included within the definition of electrolytic cell structural members. In the case of this type of integrated structure, the reverse current absorption body 634 may be installed in a position on the side of the integrated structure that contacts the cathode 630 or the anode 614, in a similar manner to that described for the third reference embodiment.

The reverse current absorption bodies 634 are preferably coupled to the electrolytic cell structural members described above by welding, but may also be attached by metal securing means such as wires. Further, the reverse current absorption bodies 634 may be coated with a wire gauze such as a woven mesh before being coupled to the electrolytic cell structural members.

The reverse current absorption bodies 634 are connected electrically to the cathode 630 and the anode 614 via the partition wall 604, the frame 602, the support members 608, the cathode current collector 628, the anode current collector 618, and the elastic bodies 616 and 626.

When operation of the electrolyzer is stopped and a reverse current is generated, the reactions (1) and (2) proceed at the cathode side. Because the cathode 630 is maintained at the same potential as the reverse current absorption bodies 634, oxidation reactions do not proceed at the cathode 630 while the oxidation reactions (1) and (2) are occurring, meaning the catalyst formed on the cathode 630 is protected. Further, the reactions (5), (6) and (7) proceed at the anode side, and because the anode 614 is maintained at the same potential as the reverse current absorption bodies 634, cathodic polarization does not occur beyond this potential. As a result, when electrolysis is restarted, anode degradation due to catalyst elution or a deterioration in conductivity can be prevented.

EXAMPLES

Example 1

First, 0.5 g of a raw material powder obtained by mixing metallic nickel particles (average particle size: 4.5 μm) and Raney nickel (Ni—Al) particles (Ni:Al=50:50 (mass ratio), average particle size: 45 μm) in a ratio of 50:50 (mass ratio) was molded under the following conditions.

Molded body size: diameter 10 mm×thickness 1.4 mm
Molding pressure: 740 MPa

The molded body was sintered at 700° C. for 2 hours. The thus obtained sintered compact was immersed in a 30 wt % aqueous solution of NaOH at 90° C. for 2 hours to elute the alkali-soluble component (Al) in the sintered compact.

Using Ni wire, the above sintered compact was secured as a reverse current absorption body to an active cathode with an area of 4 cm². A nickel woven mesh having a catalyst layer containing Ru formed on the surface was used as the active cathode. The sintered compact was attached to the elastic body-side surface of the cathode in substantially the central portion of the cathode.

An elastic body (coil cushion formed from nickel) and the above cathode were disposed on a cathode current collector (pure nickel expanded metal) to form a cathode structure. Using this cathode structure, electrolysis was performed under the following conditions.

Counter electrode: Ni expanded mesh
Electrolyte: 30 wt % aqueous solution of NaOH, temperature: 90° C.
Current density during electrolysis: 10 kA/m²
Electrolysis time: 1 hour After completion of the electrolysis, a reverse current of 400 A/m² was applied. The discharge capacity of Example 1 was calculated from the amount of electricity required for the cathode potential to reach 0 V (vs. Hg/HgO). The discharge capacity varies depending on the experimental conditions, but in this example, is the value obtained when electrolysis was performed under the above electrolysis conditions for one hour at 10 kA/m², and a reverse current of 400 A/m² was subsequently applied.

Reference Example 1

A sintered compact prepared using the same method as Example 1 was disposed as a reverse current absorption body on a cathode current collector (pure nickel expanded metal). A woven mesh (of nickel) was mounted on top of the sintered compact, and an elastic body (coil cushion formed from nickel) and an active cathode with an area of 4 cm² (having a catalyst layer containing Ru formed on the surface of a nickel woven mesh) were then disposed on top, forming a cathode structure. Using this cathode structure, electrolysis was performed under the same conditions as Example 1.

After completion of the electrolysis, a reverse current of 400 A/m² was applied. The discharge capacity of Reference Example 1 was calculated from the amount of electricity required for the cathode potential to reach 0 V (vs. Hg/HgO).

Comparative Example 1

A substrate (nickel expanded metal) was subjected to Raney nickel dispersive plating, forming a reverse current absorption body provided with a thin-film reverse current absorption layer of about 300 μm.

This reverse current absorption body of Comparative Example 1 was used as a current collector, and combined with a similar elastic body and cathode to those used in Reference Example 1 to prepare a cathode structure. This cathode structure was then subjected to electrolysis and reverse current application under the same conditions as Example 1, and the discharge capacity of Comparative Example 1 was calculated.

Comparative Example 2

The cathode, elastic body and current collector described in Reference Example 1 were combined to prepare a cathode structure. Using this cathode structure of Comparative Example 2, electrolysis and reverse current application were performed under the same conditions as Reference Example 1, and the discharge capacity of Comparative Example 2 was calculated.

The discharge capacity of Example 1 was 13.99 mF/g (95.53 F/m²). The discharge capacity of Reference Example 1 was 14.18 mF/g (96.88 F/m²). In contrast, the discharge capacity of Comparative Example 1 was 3.31 F/m², and the discharge capacity of Comparative Example 2 was 0.07 F/m². In this manner, it is evident that when a reverse current absorption body formed from a sintered compact is installed (Example 1, Reference Example 1), the discharge capacity improves dramatically.

Example 2

Using the same cathode structure as Example 1, electrolysis was performed at a current density of 10 kA/m² for 12 hours. Subsequently, a cycle of applying a reverse current for 5 hours was repeated 100 times. The reverse current was applied so that the cumulative amount of electricity relative to the reverse current absorption body was 3.66 mF/g (25 F/m²) per cycle.

Comparative Example 3

Using the same cathode structure as Comparative Example 2, electrolysis and reverse current application were performed under the same conditions as Example 2.

Figure 10:
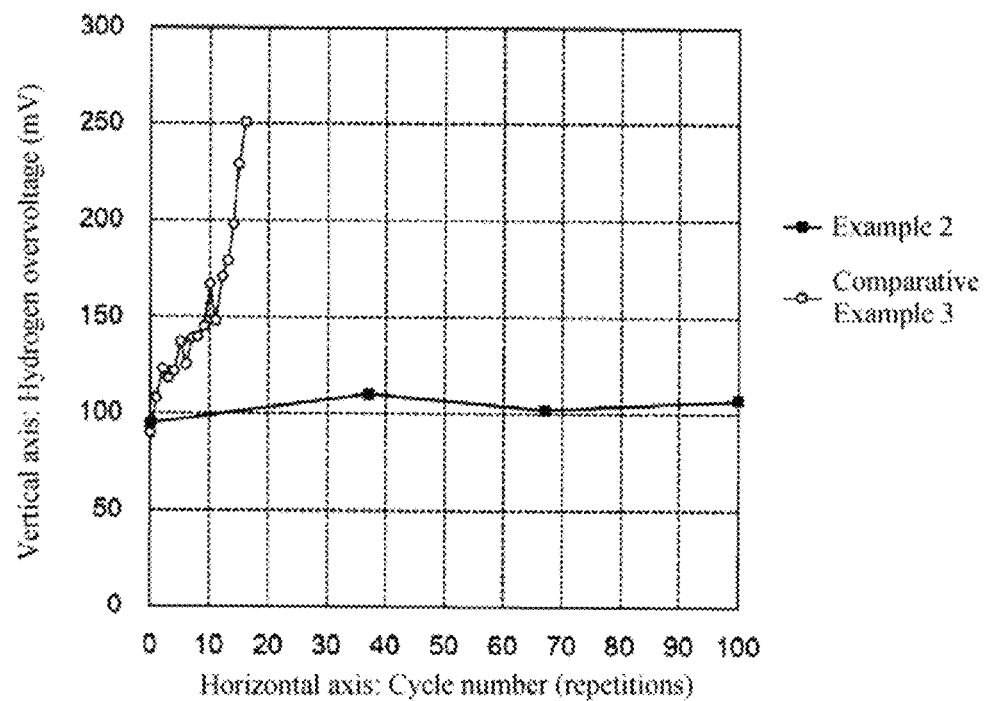
FIG. 10 is a graph illustrating the change in the hydrogen overvoltage during reverse current application cycles.

FIG. 10 is a graph illustrating the change in the hydrogen overvoltage of the active cathode during the reverse current application cycles. In the figure, the horizontal axis represents the cycle number, and the vertical axis represents the hydrogen overvoltage when the current density is 6 kA/m².

In Example 2, no ruthenium elution was confirmed during the 100 cycles. The increase in the hydrogen overvoltage following completion of the 100 cycles was about 10 to 20 mV, indicating almost no degradation.

In contrast, in Comparative Example 3, ruthenium elution was confirmed in each cycle. After the completion of 15 cycles, the hydrogen overvoltage of the active cathode had increased about 150 mV from the initial value. In the case of Comparative Example 3, the test was halted after 15 cycles.

As described above, it was evident that by installing a reverse current absorption body of the present invention, the cathode performance could be maintained even after exposure to reverse current over a long period.

Example 3

Using 0.5 g of a raw material powder obtained by mixing metallic nickel particles of different particle sizes and Raney nickel particles (the same as Example 1) in a ratio of 50:50 (mass ratio), a series of sintered compacts were produced and the alkali-soluble components were eluted under the following conditions.

Molded body size: diameter 10 mm×thickness 1.4 to 1.5 mm
Molding pressure: 740 MPa
Sintering temperature: 700° C.
Sintering time: 2 hours
Immersion solution: 30 wt % aqueous solution of NaOH, 90° C.
Immersion time: 7 hours Using the same procedure as Example 1, the thus obtained sintered compacts were each coupled as a reverse current absorption body to an active cathode (of the same type as Example 1), thus forming a series of cathode structures. Electrolysis and reverse current application were then performed under the same conditions as Example 1, and the discharge capacity of each example was calculated. The results are shown in Table 1.

TABLE 1

| | Metallic nickel particles average particle size (μm) | Discharge capacity (mF/g) | (F/m²) |
|---|---|---|---|
| Sample 1 | 0.13 | 2.24 | 15.39 |
| Sample 2 | 0.2 | 3.13 | 20.16 |
| Sample 3 | 0.4 | 5.83 | 39.58 |
| Sample 4 | 2.5 | 6.38 | 44.34 |
| Sample 5 | 4 | 9.23 | 62.65 |
| Sample 6 | 10 | 2.92 | 20.02 |

TABLE 1-continued

| | Metallic nickel particles average particle size (μm) | Discharge capacity | |
|---|---|---|---|
| | | (mF/g) | (F/m²) |
| Sample 7 | 50 | 2.06 | 13.27 |
| Sample 8 | 100 | The sample did not maintain its shape after immersion | |

The results revealed that a high discharge capacity of at least 1.5 mF/g (at least 10 F/m²) was obtained across the entire average particle size range from 0.13 to 50 μm (samples 1 to 7). When the average particle size of the metallic nickel particles was from 0.2 to 10 μm (samples 2 to 6), a very high discharge capacity exceeding 2.92 mF/g (20 F/m²) was obtained. Further, an even higher discharge capacity was obtained when the average particle size of the metallic nickel particles was within a range from 0.4 to 4 μm, and particularly when the average particle size was from 2.5 to 4 μm.

Example 4

Ni—Al—Ru—Sn Raney alloy particles (average particle size: 45 μm) were prepared as Raney nickel alloy particles. The composition of the alloy particles was Ni:Al:Ru:Sn=35.6:49.4:1:14 (mass ratio). These Raney nickel alloy particles and the metallic nickel particles of Example 1 were mixed together in a ratio of 50:50 (mass ratio) to obtain a raw material powder.

Example 5

Ni—Al—Ti—Ru—Co Raney alloy particles (average particle size: 45 μm) were prepared as Raney nickel alloy particles. The composition of the alloy particles was Ni:Al:Ti:Ru:Co=50.2:45.8:2:1:1 (mass ratio). These Raney nickel alloy particles and the metallic nickel particles of Example 1 were mixed together in a ratio of 50:50 (mass ratio) to obtain a raw material powder.

Using 0.5 g samples of the raw material powders of Examples 4 and 5, molding was performed under the following conditions.

Molded body size: diameter 10 mm×thickness 1.4 mm
Molding pressure: 740 MPa

Each molded body was sintered at 700° C. for 2 hours. The thus obtained sintered compacts were each immersed in a 30 wt % aqueous solution of NaOH at 90° C. for 7 hours to elute the alkali-soluble component (Al) in the sintered compact.

Using the same procedure as Example 1, each of the above sintered compacts was coupled as a reverse current absorption body to an active cathode (of the same type as Example 1), thus forming a cathode structure. Electrolysis and reverse current application were then performed under the same conditions as Example 1, and the discharge capacity was calculated.

The discharge capacity of Example 4 was 10.84 mF/g (73.66 F/m²). The discharge capacity of Example 5 was 3.60 mF/g (24.44 F/m²). These experiments showed that a high discharge capacity could be obtained even in cases where a multicomponent Raney nickel alloy was used.

Example 6

Using 0.5 g samples of raw material powders obtained by mixing metallic nickel particles (average particle size: 4 μm) and Raney nickel (Ni—Al) particles (Ni:Al=50:50 or 40:60 (mass ratio), average particle size: 45 μm) in various mixing ratios, sintered compact samples 9 to 22 having various nickel content and density values were prepared. Molding and elution of the alkali-soluble component were performed under the following conditions.

Molded body size: diameter 10 mm×thickness 0.9 to 2.1 mm
Molding pressure: 740 MPa
Sintering temperature: 700° C.
Sintering time: 2 hours
Immersion solution: 30 wt % aqueous solution of NaOH, 90° C.
Immersion time: 24 hours Using the same procedure as Example 1, the thus obtained sintered compacts were each coupled as a reverse current absorption body to an active cathode (of the same type as Example 1), thus forming a series of cathode structures. Electrolysis and reverse current application were then performed under the same conditions as Example 1, and the discharge capacity of each example was calculated. The results are shown in Table 2. In Table 2, the "nickel content" represents the value determined from the total amount of nickel in the metallic nickel particles and the nickel-aluminum alloy particles prior to the immersion step.

TABLE 2

| Sample name | Amount of metallic nickel particles (% by mass) | Ni/Al ratio of Raney nickel alloy | Nickel content (% by mass) | Density before immersion step (g/cm³) | Density after immersion step (g/cm³) | Change in surface layer after immersion step | Discharge capacity (mF/g) | Discharge capacity (F/m²) |
|---|---|---|---|---|---|---|---|---|
| Sample 9 | 0 | 40/60 | 40.0 | 2.91 | — | sample shape was not maintained | — | — |
| Sample 10 | 5 | 40/60 | 43.0 | 2.93 | 1.27 | sample shape was not maintained | — | — |
| Sample 11 | 15 | 40/60 | 49.0 | 3.26 | 2.18 | some loss of surface layer particles | 10.56 | 72.5 |
| Sample 12 | 5 | 50/50 | 52.5 | 3.44 | 2.09 | some loss of surface | 9.45 | 64.6 |

TABLE 2-continued

| Sample name | Amount of metallic nickel particles (% by mass) | Ni/Al ratio of Raney nickel alloy | Nickel content (% by mass) | Density before immersion step (g/cm³) | Density after immersion step (g/cm³) | Change in surface layer after immersion step | Discharge capacity (mF/g) | Discharge capacity (F/m²) |
|---|---|---|---|---|---|---|---|---|
| Sample 13 | 24 | 40/60 | 54.4 | 3.50 | 2.59 | layer particles no change | 12.91 | 85.8 |
| Sample 14 | 15 | 50/50 | 57.5 | 3.63 | 2.87 | no change | 9.03 | 60.2 |
| Sample 15 | 25 | 50/50 | 62.5 | 3.90 | 3.39 | no change | 7.52 | 50.5 |
| Sample 16 | 50 | 50/50 | 75.0 | 4.92 | 4.65 | no change | 9.23 | 62.7 |
| Sample 17 | 65 | 50/50 | 82.5 | 5.56 | 5.18 | no change | 4.07 | 27.3 |
| Sample 18 | 75 | 50/50 | 87.5 | 5.95 | 5.62 | no change | 2.98 | 20.1 |
| Sample 19 | 80 | 50/50 | 90.0 | 6.51 | 6.38 | no change | 1.55 | 10.2 |
| Sample 20 | 85 | 50/50 | 92.5 | 6.94 | 6.89 | no change | 0.85 | 5.5 |
| Sample 21 | 90 | 50/50 | 95.0 | 7.35 | 7.31 | no change | 0.38 | 2.5 |
| Sample 22 | 100 | 50/50 | 100.0 | 7.58 | 7.58 | no change | 0.06 | 0.4 |

In samples 9 and 10, which either contained no metallic nickel particles, or contained metallic nickel particles but had a low total nickel content, the hydrogen gas generated from the sample during the immersion step meant that the sample itself was unable to maintain its shape, and the sample disintegrated. Further, in samples 11 and 12 in which the nickel content was low, although the loss of some surface particles was observed during the immersion step, the sample shape was maintained.

Figure 11:
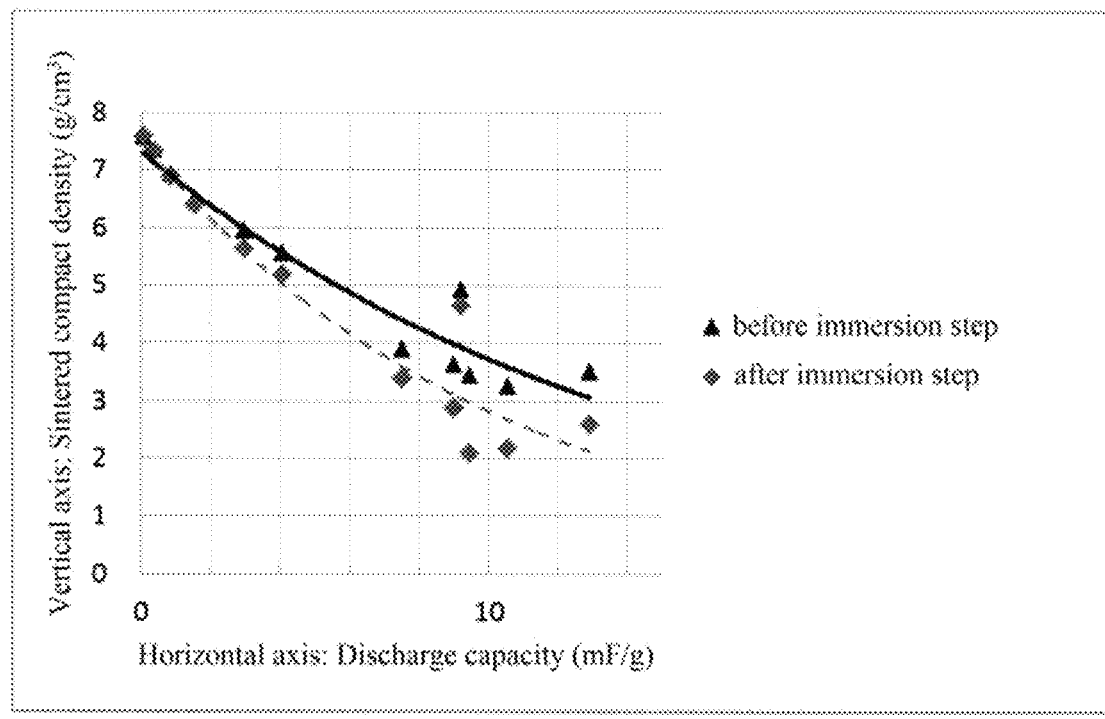
FIG. 11 is a diagram illustrating the relationship between the discharge capacity and the sintered compact density in a case where metallic nickel particles having an average particle size of 4 μm and Raney nickel are used.

The relationship between the discharge capacity and the sintered compact density in Table 2 is shown in FIG. 11. The values before the immersion step have a curve (solid line in the figure) that decreases gently toward the right from the value when the nickel content is 100% (7.58 g/cm³, 0.06 mF/g). Further, the values after the immersion step also decrease toward the right from the value when the nickel content is 100% (7.58 g/cm³, 0.06 mF/g), and follow a curve (dashed line in the figure) positioned below the curve for the values before the immersion step.

Example 7

By mixing metallic nickel particles (average particle size: 50 μm) and Raney nickel (Ni-Al) particles (Ni:Al=40:60 (mass ratio), average particle size: 45 μ.m), and using a 0.5 g sample of a raw material powder having a different mixing ratio from sample 7 of Example 3, a sintered compact sample 23 having different nickel content and density values was prepared. Molding and elution of the alkali-soluble component were performed under the following conditions.

Molded body size: diameter 10 mm×thickness 1.9 mm
Molding pressure: 740 MPa
Sintering temperature: 700° C.
Sintering time: 2 hours
Immersion solution: 30 wt % aqueous solution of NaOH, 90° C.
Immersion time: 24 hours Using the same procedure as Example 1, the thus obtained sintered compacts were each coupled as a reverse current absorption body to an active cathode (of the same type as Example 1), thus forming a series of cathode structures. Electrolysis and reverse current application were then performed under the same conditions as Example 1, and the discharge capacity of each example was calculated. The results are shown in Table 3.

TABLE 3

| Sample name | Amount of metallic nickel particles (% by mass) | Ni/Al ratio of Raney nickel alloy | Nickel content (% by mass) | Density before immersion step (g/cm³) | Density after immersion step (g/cm³) | Change in surface layer after immersion step | Discharge capacity (mF/g) | Discharge capacity (F/m²) |
|---|---|---|---|---|---|---|---|---|
| Sample 7 | 50 | 50/50 | 75.0 | 4.39 | 3.92 | no change | 2.06 | 13.3 |
| Sample 23 | 24 | 40/60 | 54.4 | 3.36 | 2.10 | some loss of surface layer particles | 4.64 | 30.2 |

Figure 12:
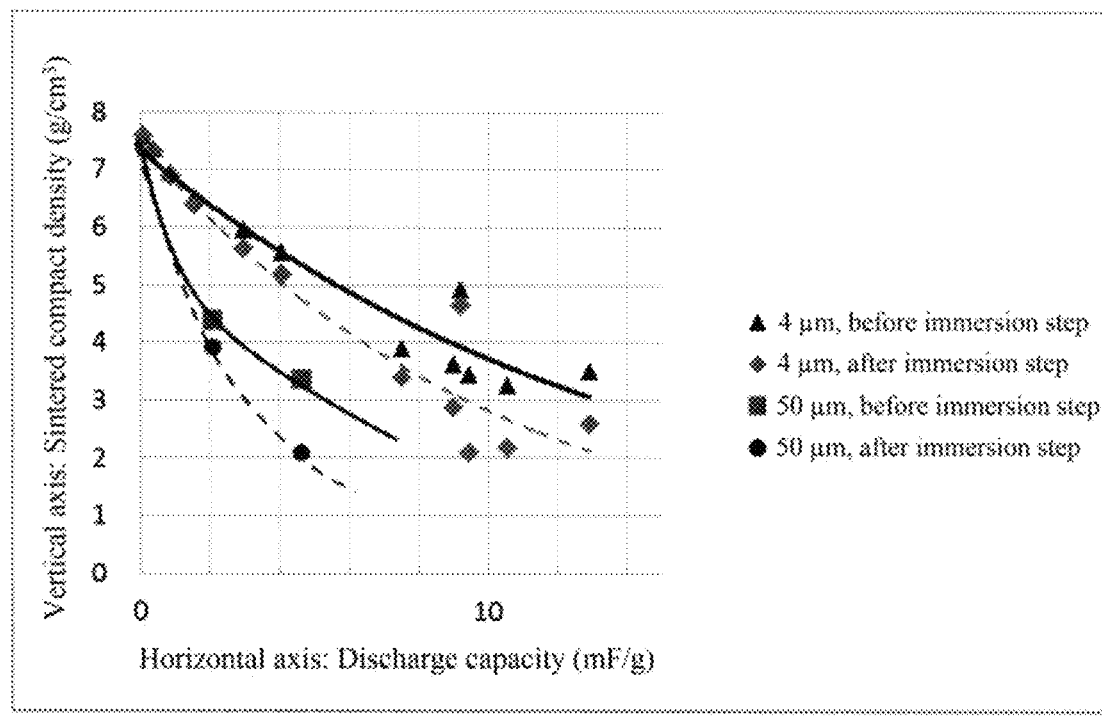
FIG. 12 is a diagram illustrating the relationship between the discharge capacity and the sintered compact density in cases where metallic nickel particles having average particle sizes of 4 μm and 50 μm and Raney nickel are used.

A graph obtained by adding the relationship between the discharge capacity and the sintered compact density in Table 3 to the values in FIG. 11 is shown in FIG. 12. When the average particle size of the metallic nickel particles is 50 μm, the values exhibit a similar discharge capacity-sintered compact density relationship to that observed when the average particle size is 4 μm. In other words, the values before the immersion step have a curve (solid line in the figure) that decreases gently toward the right from the value when the nickel content is 100% (7.58 g/cm³, 0.06 mF/g). Further, the values after the immersion step also decrease gently toward the right from the value when the nickel content is 100% (7.58 g/cm³, 0.06 mF/g), and follow a curve (dashed line in the figure) positioned below the curve for the values before the immersion step. Based on the results of Example 6 and Example 7, it is evident that this discharge capacity-sintered compact density relationship applies even when the particle size of the metallic nickel particles is changed.

Moreover, the results obtained by adding the measurement results for the sintered compact density after the immersion step for the samples 1 to 7 from Example 3 are shown in Table 4. Further, a graph obtained by adding the relationship between the discharge capacity and the sintered compact density in Table 4 to the values in FIG. 12 is shown in FIG. 13.

TABLE 4

| Sample name | Amount of metallic nickel particles (% by mass) | Ni/Al ratio of Raney nickel alloy | Nickel content (% by mass) | Density before immersion step (g/cm³) | Density after immersion step (g/cm³) | Change in surface layer after immersion step | Discharge capacity (mF/g) | Discharge capacity (F/m²) |
|---|---|---|---|---|---|---|---|---|
| Sample 1 | 50 | 50/50 | 75.0 | 4.63 | 4.22 | no change | 2.24 | 15.4 |
| Sample 2 | 50 | 50/50 | 75.0 | 4.53 | 4.21 | no change | 3.13 | 21.2 |
| Sample 3 | 50 | 50/50 | 75.0 | 4.89 | 4.53 | no change | 5.83 | 39.6 |
| Sample 4 | 50 | 50/50 | 75.0 | 4.82 | 4.48 | no change | 6.38 | 44.3 |
| Sample 5 | 50 | 50/50 | 75.0 | 4.92 | 4.65 | no change | 9.23 | 62.7 |
| Sample 6 | 50 | 50/50 | 75.0 | 4.55 | 4.22 | no change | 2.92 | 20.0 |
| Sample 7 | 50 | 50/50 | 75.0 | 4.39 | 3.92 | no change | 2.06 | 13.3 |

Figure 13:
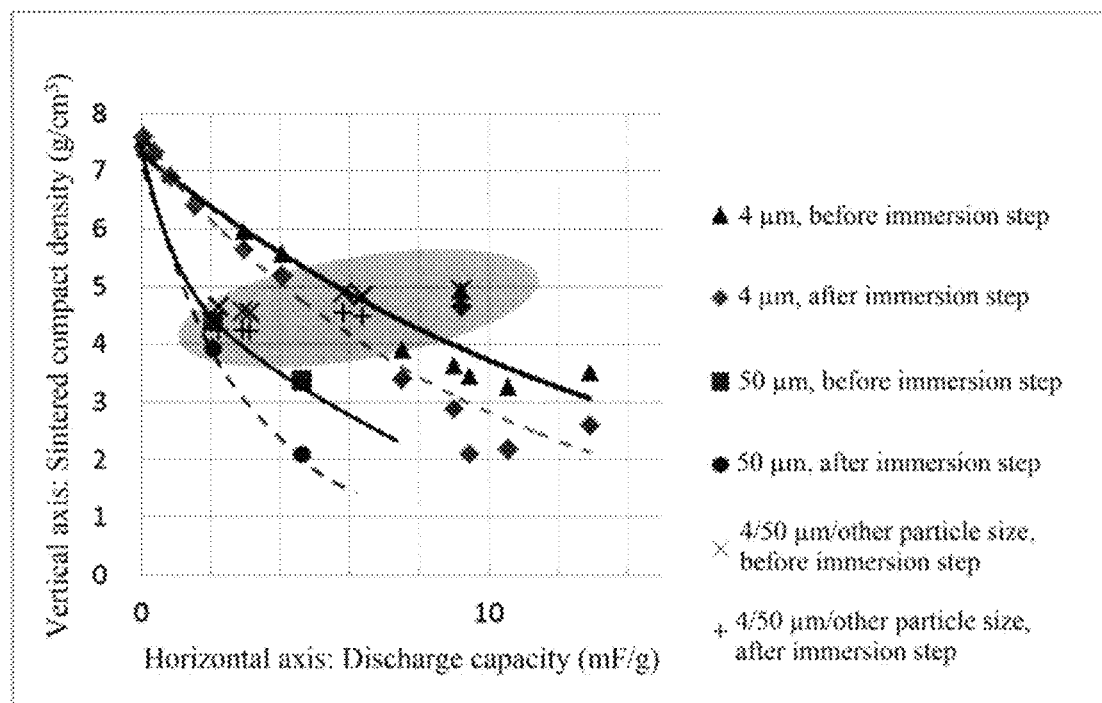
FIG. 13 is a diagram illustrating the relationship between the discharge capacity and the sintered compact density in cases where metallic nickel particles having average particle sizes of 4 μm, 50 μm and other average particle sizes, and Raney nickel are used.

By changing the average particle size of the nickel, the relationship between the discharge capacity and the sintered compact density changes in the manner shown in the shaded region in FIG. 13, and satisfies the correlations shown in FIG. 11 and FIG. 12 at each particle size. From FIG. 13 it is evident that the results at which the discharge capacity-sintered compact density correlation is farthest right are when the average particle size of the nickel is 4 μm. If this observation is considered in combination with the fact that the discharge capacity-sintered compact density correlation is a curve that decreases gently toward the right, then the sintered compact densities that exhibit the same amount of reverse current absorption exhibit a maximum when the nickel average particle size is 4 μm.

In order to achieve the effects of the present invention, the sintered compact must have a discharge capacity of at least 1.5 mF/g (10 F/m²). In terms of satisfying this condition, the upper limit for the density of a sintered compact of nickel particles having an average particle size of 4 μm is 6.51 g/cm³.

Based on the above Example 6 and Example 7, the following facts are evident. The nickel content in the reverse current absorption body is preferably from 45 to 90% by mass. Provided the nickel content is within this range, the shape of the reverse current absorption body can be maintained even after the immersion step, and a high discharge capacity exceeding 1.5 mF/g (10 F/m²) can be obtained. From the viewpoint of durability, this nickel content is more preferably from 53 to 90% by mass. Moreover, if the reverse current absorption performance is also taken into consideration, then the nickel content is even more preferably from 53 to 87.5% by mass, and is most preferably from 53 to 77.5% by mass.

Further, the density of the reverse current absorption body is preferably from 2.00 to 6.51 g/cm³. Provided the density is within this range, the shape of the reverse current absorption body can be maintained even after the immersion step, and a high discharge capacity exceeding 1.5 mF/g (10 F/m²) can be obtained. From the viewpoint of durability, this density is more preferably from 2.30 to 6.51 g/cm³. Moreover, if the reverse current absorption performance is also taken into consideration, then the density is even more preferably from 2.30 to 5.95 g/cm³, and is most preferably from 2.30 to 5.10 g/cm³.

DESCRIPTION OF THE REFERENCE SIGNS 10, 100, 140, 200, 300, 400, 500, 600: Electrolytic cell
12: Electrode
14, 106, 206, 506, 606: Gasket
102, 202, 302, 402, 502, 602: Frame
104, 204, 304, 404, 504, 604: Partition wall
108, 208, 308, 408, 508, 608: Support member
110, 210, 310, 410, 510, 610: Anode chamber
114, 214, 314, 414, 514, 614: Anode
116, 316, 516: Buffer plate
120, 220, 320, 420, 520, 620: Cathode chamber
122, 222: Cathode structure
126, 216, 226, 326, 416, 426, 526, 616, 626: Elastic body
128, 228, 328, 428, 528, 628: Cathode current collector
130, 230, 330, 430, 530, 630: Cathode
132, 232, 332, 432: Conductive substrate
134, 234, 334, 434, 534, 634: Reverse current absorption body
212: Anode structure
218, 418, 618: Anode current collector

The invention claimed is:

1. An electrode for electrolysis comprising:
   a conductive substrate on which a catalyst layer is formed, and
   at least one reverse current absorption body that is coupled to the conductive substrate in a detachable manner, wherein
   the at least one reverse current absorption body is formed from a sintered compact containing nickel, and
   wherein the at least one reverse current absorption body does not comprise a substrate.

2. The electrode for electrolysis according to claim 1, wherein the at least one reverse current absorption body is coupled to an end portion of the conductive substrate.

3. The electrode for electrolysis according to claim 1, wherein a nickel content in the sintered compact containing nickel is from 45 to 90% by mass.

4. The electrode for electrolysis according to claim 1, wherein a density of the at least one reverse current absorption body is from 2.00 to 6.51 g/cm³.

5. The electrode for electrolysis according to claim 1, wherein the sintered compact comprises metallic nickel particles having an average particle size of 4 μm and Raney nickel.

6. A method for producing the electrode for electrolysis according to claim 1, the method comprising:
- a sintered compact formation step of obtaining the sintered compact by sintering a raw material powder composed of any one of Raney nickel alloy particles containing nickel and an alkali-soluble metal element, metallic nickel particles, and a mixture of the Raney nickel alloy particles and the metallic nickel particles, and
- a coupling step of coupling the sintered compact to the conductive substrate.

7. The method for producing the electrode for electrolysis according to claim 6, further comprising:
- a post-coupling immersion step of immersing the sintered compact that has been coupled to the conductive substrate in the coupling step in an electrolyte containing an alkali metal hydroxide.

8. The method for producing the electrode for electrolysis according to claim 6, further comprising:
- a pre-coupling immersion step of immersing the sintered compact obtained in the sintered compact formation step in a solution containing an alkali metal hydroxide, wherein
- the sintered compact that has been subjected to the pre-coupling immersion step is then coupled to the conductive substrate in the coupling step.

9. An electrolyzer having an anode, an anode chamber housing the anode, a cathode, a cathode chamber housing the cathode, and a diaphragm that separates the anode chamber and the cathode chamber, wherein
- at least one of the cathode and the anode is the electrode for electrolysis according to claim 1.

\* \* \* \* \*